US012573706B2

(12) United States Patent
Gu et al.

(10) Patent No.: US 12,573,706 B2
(45) Date of Patent: Mar. 10, 2026

(54) BATTERY MODULE HAVING GUIDE FRAME AND METHOD OF MANUFACTURING THE SAME

(71) Applicant: LG ENERGY SOLUTION, LTD., Seoul (KR)

(72) Inventors: Ja Eon Gu, Daejeon (KR); Jae Uk Ryu, Daejeon (KR); Jin Hak Kong, Daejeon (KR); Min Ho Kwon, Daejeon (KR)

(73) Assignee: LG ENERGY SOLUTION, LTD., Seoul (KR)

( * ) Notice: Subject to any disclaimer, the term of this patent is extended or adjusted under 35 U.S.C. 154(b) by 621 days.

(21) Appl. No.: 18/012,899

(22) PCT Filed: Sep. 8, 2021

(86) PCT No.: PCT/KR2021/012184
§ 371 (c)(1),
(2) Date: Dec. 23, 2022

(87) PCT Pub. No.: WO2022/102933
PCT Pub. Date: May 19, 2022

(65) Prior Publication Data
US 2023/0268603 A1 Aug. 24, 2023

(30) Foreign Application Priority Data
Nov. 16, 2020 (KR) ........................ 10-2020-0152502

(51) Int. Cl.
*H01M 50/291* (2021.01)
*H01M 10/04* (2006.01)
(Continued)

(52) U.S. Cl.
CPC ......... *H01M 50/291* (2021.01); *H01M 10/04* (2013.01); *H01M 10/658* (2015.04); *H01M 50/213* (2021.01)

(58) Field of Classification Search
CPC .. H01M 50/291; H01M 10/04; H01M 10/658; H01M 50/213; H01M 50/293;
(Continued)

(56) References Cited

U.S. PATENT DOCUMENTS

2008/0268328 A1* 10/2008 Lee .................. H01M 10/6566
429/83
2011/0052957 A1 3/2011 Ohta
(Continued)

FOREIGN PATENT DOCUMENTS

CN 110088938 A 8/2019
CN 110495014 A 11/2019
(Continued)

OTHER PUBLICATIONS

International Search Report (with partial translation) and Written Opinion dated Dec. 21, 2021, issued in corresponding International Patent Application No. PCT/KR2021/012184.
(Continued)

*Primary Examiner* — Lisa S Park
(74) *Attorney, Agent, or Firm* — Morgan, Lewis & Bockius LLP

(57) ABSTRACT
A battery module having a guide frame and a method of manufacturing the same are provided. The battery module including a plurality of cylindrical battery cells; a frame assembly configured to receive the cylindrical battery cells; and a module case configured to wrap the cylindrical battery cells and the frame assembly. The frame assembly includes a frame body having first receiving holes therein; and guide portions in the first receiving holes.

10 Claims, 5 Drawing Sheets

(51) Int. Cl.
    *H01M 10/658*        (2014.01)
    *H01M 50/213*      (2021.01)
    *H01M 50/293*      (2021.01)

(58) Field of Classification Search
    CPC .. H01M 50/20; H01M 50/24; B29K 2075/00;
                 B29K 2995/0007; B29K 2995/0015;
                 B29C 44/583; B29C 44/42; B29C 44/02;
                 B29C 44/58; B29L 2031/00; B29L
                 2031/3412; B29L 2031/3468; B29L
                 2031/7146; Y02E 60/10
    See application file for complete search history.

(56) References Cited

U.S. PATENT DOCUMENTS

| | | | |
|---|---|---|---|
| 2013/0143074 A1* | 6/2013 | Kim | B29C 45/1676 |
| | | | 264/272.21 |
| 2013/0183566 A1 | 7/2013 | Wayne et al. | |
| 2014/0234668 A1 | 8/2014 | Sweney et al. | |
| 2014/0234683 A1 | 8/2014 | Sweney | |
| 2014/0234686 A1 | 8/2014 | Sweney et al. | |
| 2016/0020446 A1* | 1/2016 | Zheng | H01M 50/503 |
| | | | 429/82 |
| 2016/0093853 A1* | 3/2016 | Nakamura | H01M 50/213 |
| | | | 429/156 |
| 2016/0149169 A1* | 5/2016 | Okura | B23K 11/34 |
| | | | 429/96 |
| 2017/0047625 A1 | 2/2017 | Bhunia et al. | |
| 2018/0212222 A1 | 7/2018 | Barton et al. | |
| 2019/0267684 A1 | 8/2019 | Ryu et al. | |
| 2019/0319249 A1 | 10/2019 | Barton et al. | |
| 2019/0372069 A1 | 12/2019 | Lee et al. | |
| 2020/0022779 A1 | 1/2020 | Pedulla | |
| 2020/0035967 A1 | 1/2020 | Yoon et al. | |
| 2020/0044227 A1 | 2/2020 | Ryu et al. | |
| 2020/0144658 A1 | 5/2020 | Polus | |
| 2020/0194853 A1 | 6/2020 | Yoo et al. | |
| 2021/0167453 A1 | 6/2021 | Kawakami et al. | |
| 2021/0320343 A1* | 10/2021 | Flannery | H01M 10/6568 |

FOREIGN PATENT DOCUMENTS

| | | |
|---|---|---|
| EP | 2 272 118 B1 | 7/2016 |
| EP | 654 444 A1 | 5/2020 |
| JP | 2009-172844 A | 8/2009 |
| JP | 2012-054121 A | 3/2012 |
| JP | WO2019/021880 A1 | 1/2019 |
| KR | 10-0839374 B1 | 6/2008 |
| KR | 10-2013-0062197 A | 6/2013 |
| KR | 10-2015-0112917 A | 10/2015 |
| KR | 10-2015-0121039 A | 10/2015 |
| KR | 10-2018-0055399 A | 5/2018 |
| KR | 10-2018-0106687 A | 10/2018 |
| KR | 10-2018-0117033 A | 10/2018 |
| KR | 10-2019-0032887 A | 3/2019 |
| KR | 10-2019-0040403 A | 4/2019 |
| KR | 10-2020-0053426 A | 5/2020 |
| WO | 2018/134704 A1 | 7/2018 |
| WO | 2019/208157 A1 | 10/2019 |

OTHER PUBLICATIONS

The extended European search report issued in corresponding EP Patent Application No. 21892103.9 dated Aug. 22, 2024.
Office Action issued in corresponding Korean Patent Application No. 10-2020-0152502 dated Apr. 3, 2025.
Office Action issued in corresponding European Patent Application No. 21892103.9 dated Jun. 2, 2025.
Office Action issued in corresponding Chinese Patent Application No. 202180046016.4 dated Sep. 18, 2025.

\* cited by examiner

【FIG. 1】
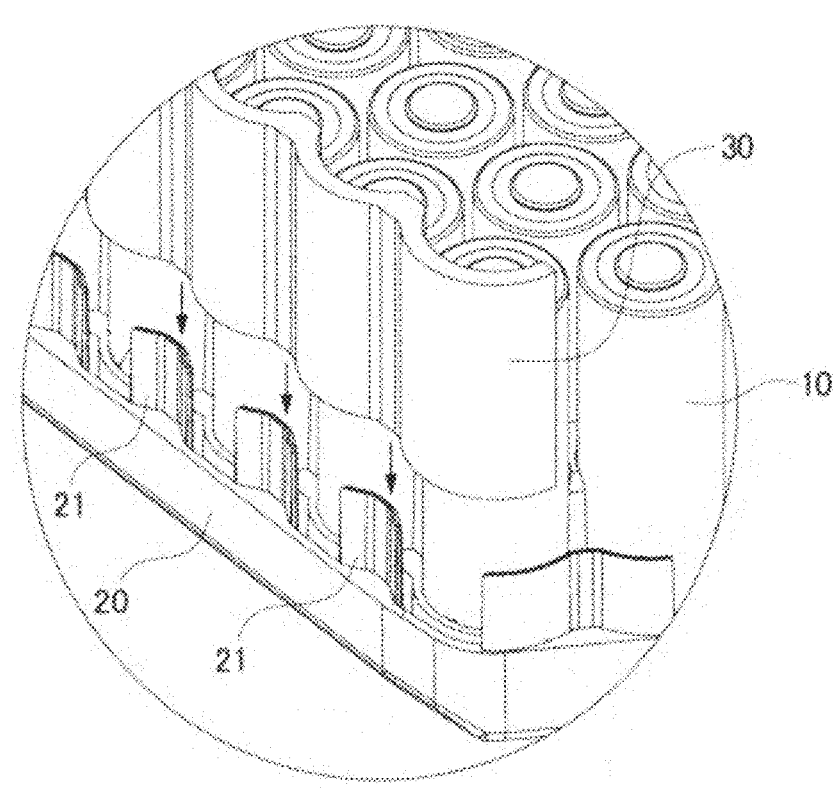
【FIG. 2】
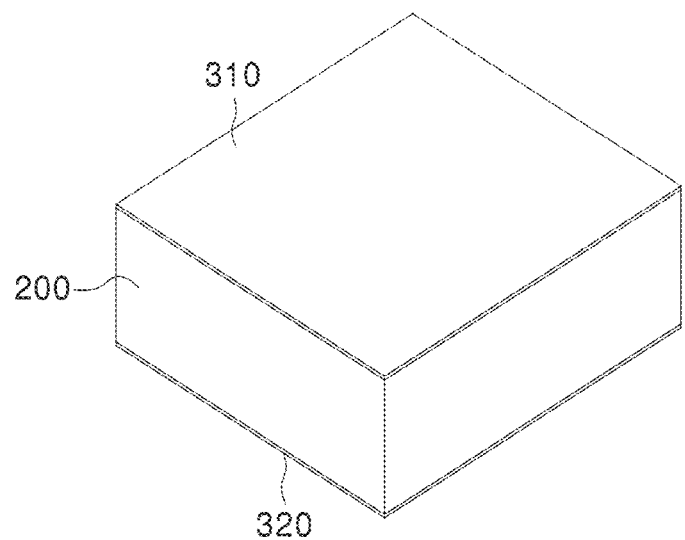

【FIG. 3】
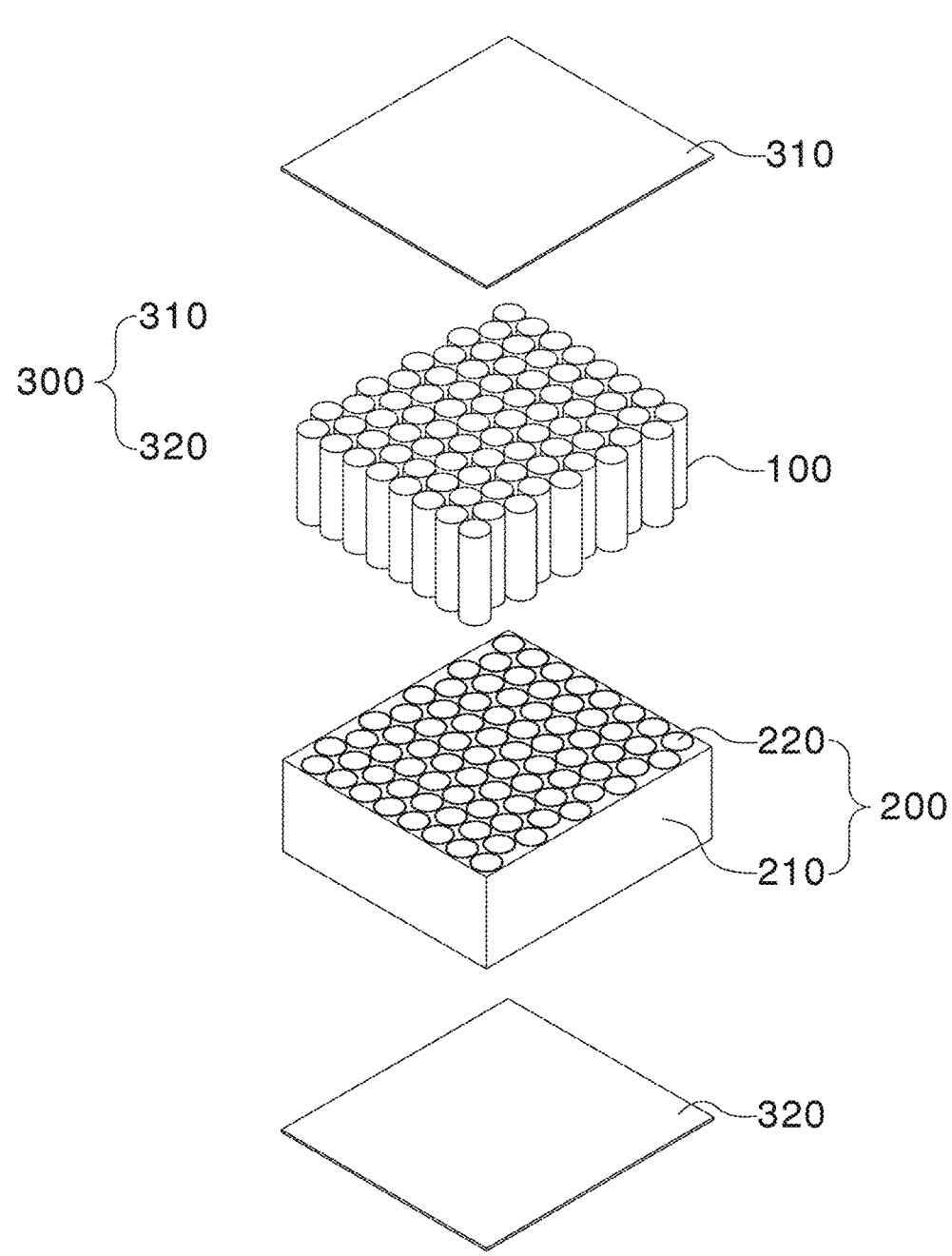

【FIG. 4】
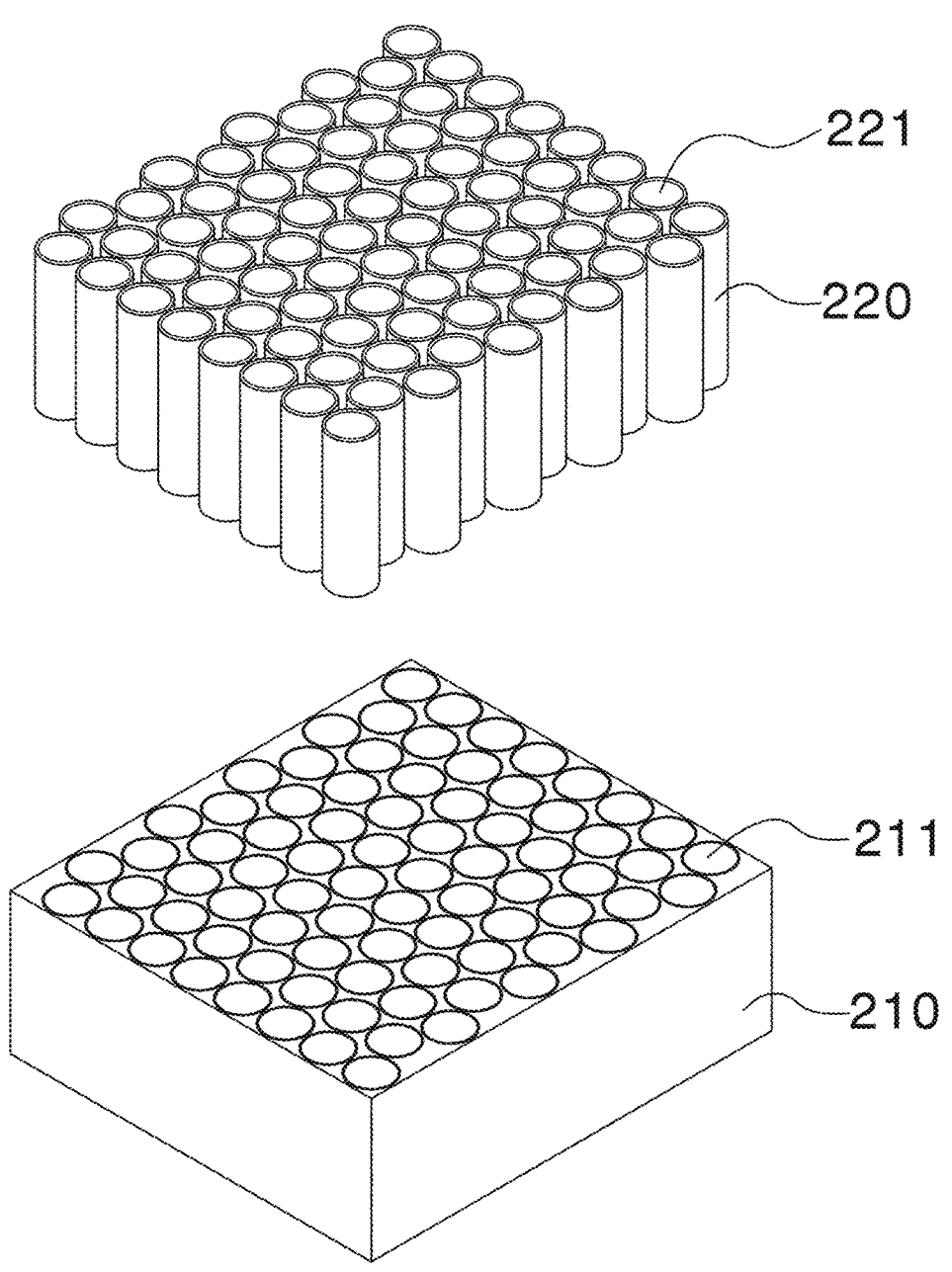

【FIG. 5】
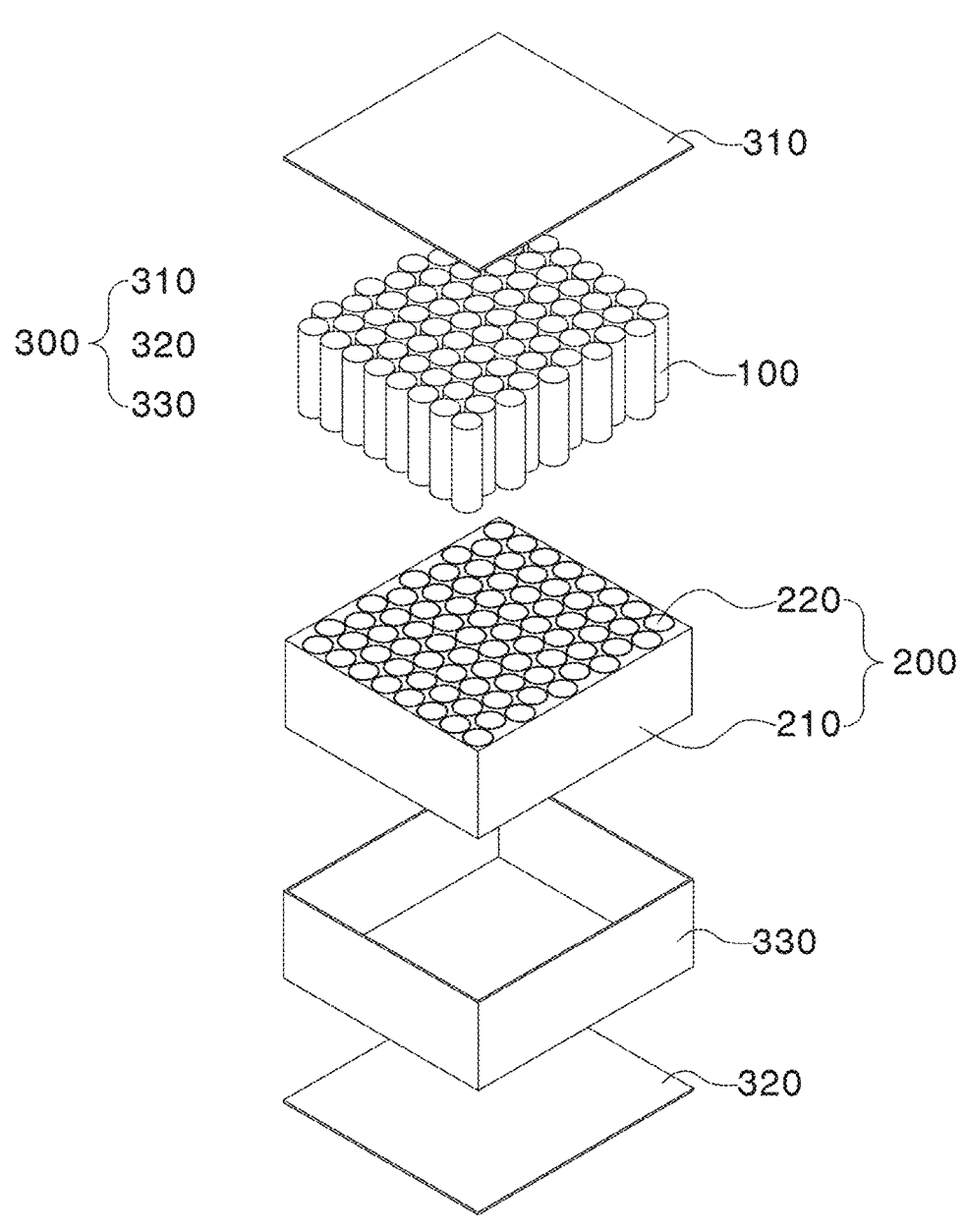

【FIG. 6】
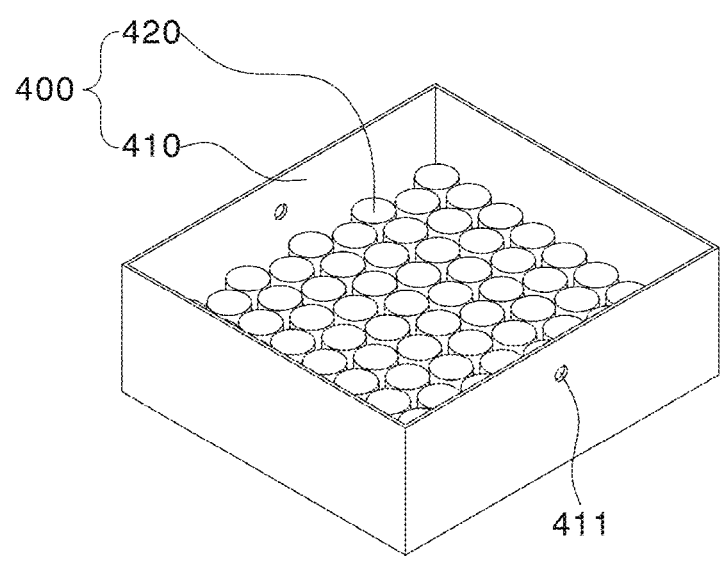
【FIG. 7】
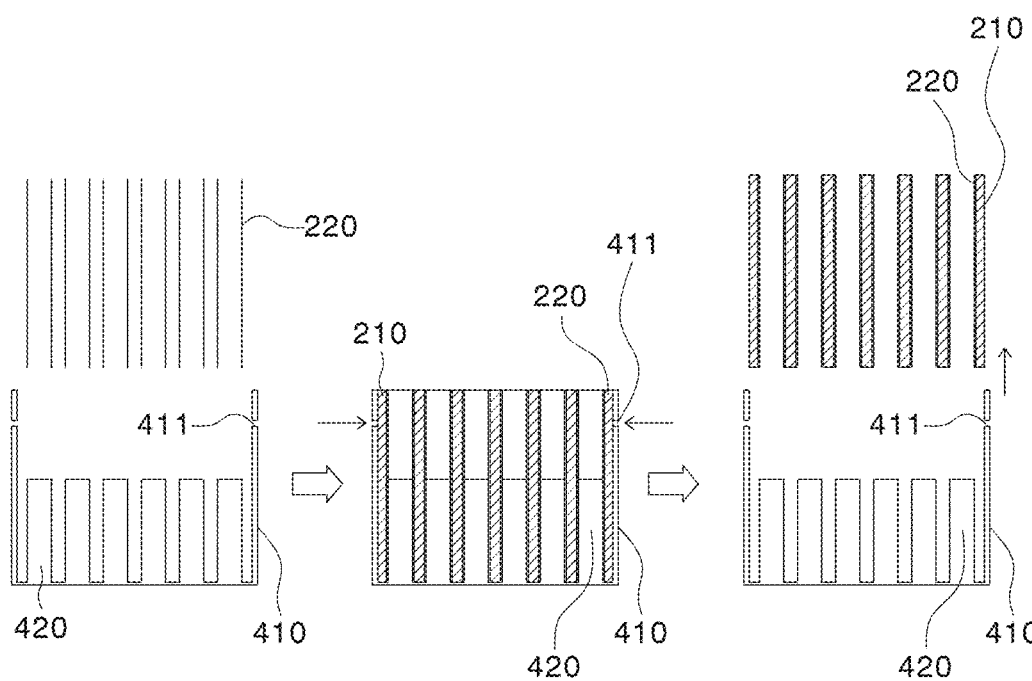

BATTERY MODULE HAVING GUIDE FRAME AND METHOD OF MANUFACTURING THE SAME

TECHNICAL FIELD

This application claims the benefit of priority to Korean Patent Application No. 2020-0152502 filed on Nov. 16, 2020, the disclosure of which is incorporated herein by reference in its entirety.

The present invention relates to a battery module having a guide frame and a method of manufacturing the same, and more particularly to a battery module having a guide frame, wherein guide portions are provided in a frame body filling a space between cylindrical battery cells, whereby it is possible to reduce a defect rate of the battery module and to improve efficiency of a manufacturing process, and a method of manufacturing the same.

BACKGROUND ART

With recent development of alternative energies due to air pollution and energy depletion caused as the result of use of fossil fuels, demand for secondary batteries capable of storing electrical energy that is produced has increased. The secondary batteries, which are capable of being charged and discharged, are intimately used in daily life. For example, the secondary batteries are used in mobile devices, electric vehicles, and hybrid electric vehicles.

Required capacities of secondary batteries used as energy sources of various kinds of electronic devices inevitably used in modern society have been increased due to an increase in usage of mobile devices, increasing complexity of the mobile devices, and development of electric vehicles. In order to satisfy demand of users, a plurality of battery cells is disposed in a small-sized device, whereas a battery module including a plurality of battery cells electrically connected to each other or a battery pack including a plurality of battery modules is used in a vehicle.

Meanwhile, in order to receive a plurality of battery cells constituting a battery module, a frame having receiving holes formed therein is manufactured using a mold. At this time, a foam material is injected into the mold and is hardened to form the frame. When the hardened frame is separated from the mold, however, the frame may be damaged due to weak physical properties thereof, since the portions of the frame located between the receiving holes are thin.

FIG. 1 is a partial enlarged perspective view of a conventional battery module. As shown in FIG. 1, the conventional battery module includes a lower frame 20 configured to hold and fix lower parts of cylindrical battery cells 10 and a side frame 30 configured to wrap side surfaces of the cylindrical battery cells 10.

That is, the cylindrical battery cells 10 are seated on and fixed to the lower frame 20, and the side frame 30 is fixed to protrusions 21 of the lower frame 20 to protect the cylindrical battery cells 10.

Since the battery module is an assembly type battery module, however, a lot of time is taken to manufacture the battery module. In addition, it is difficult to surely interrupt heat transfer between the cylindrical battery cells 10, whereby secondary damage, such as outbreak of fire, may occur.

PRIOR ART DOCUMENT (Patent Document 1) Japanese Patent Application Publication No. 2019-021880

DISCLOSURE

Technical Problem

The present invention has been made in view of the above problems, and it is an object of the present invention to provide a battery module having a guide frame capable of inhibiting heat transfer between battery cells and reducing a defect rate during manufacture and a method of manufacturing the same.

Technical Solution

In order to accomplish the above object, a battery module according to the present invention includes a plurality of cylindrical battery cells (100), a frame assembly (200) configured to receive the cylindrical battery cells (100), and a module case (300) configured to wrap the cylindrical battery cells (100) and the frame assembly (200), wherein the frame assembly (200) includes a frame body (210) having first receiving holes (211) formed therein, and guide portions (220) located in the first receiving holes (211).

Also, in the battery module according to the present invention, each of the guide portions (220) may be provided with a second receiving hole 221, and each of the cylindrical battery cells (100) may be received in the second receiving hole (221).

Also, in the battery module according to the present invention, the frame body (210) may be made of a foam material having flame retardancy or a foam material having low thermal conductivity.

Also, in the battery module according to the present invention, the module case (300) may include an upper cover (310) configured to cover upper surfaces of the cylindrical battery cells (100) and the frame assembly (200) and a lower cover (320) located at a lower surface of the frame assembly (200).

Also, in the battery module according to the present invention, the module case (300) may further include a side cover (330) configured to wrap a side surface of the frame assembly (200).

In addition, the present invention provides a battery pack including the battery module.

In addition, a battery module manufacturing method according to the present invention includes locating guide portions (220) in a mold unit (400) having a plurality of support rods (420) spaced apart from each other by a predetermined distance, injecting a foam material into an empty space between the mold unit (400) and the guide portions (220), hardening the injected foam material to form a frame body (210), separating the frame body (210) integrated with the guide portions (220) from the mold unit (400), and receiving cylindrical battery cells (100) in the guide portions (220).

Also, in the battery module manufacturing method according to the present invention, the guide portions (220) may be located so as to wrap the support rods (420).

Advantageous Effects

As is apparent from the above description, a battery module having a guide frame according to the present invention and a method of manufacturing the same have an advantage in that a frame assembly is made of a material that has low thermal conductivity, whereby it is possible to inhibit heat transfer between cylindrical battery cells, and therefore it is possible to prevent secondary damage, such as outbreak of fire.

In addition, the battery module having the guide frame according to the present invention and the method of manufacturing the same have a merit in that the frame assembly is provided with guide portions, whereby it is possible to minimize damage to a frame body when the frame assembly is separated from a mold unit, and therefore it is possible to reduce a defect rate.

DESCRIPTION OF DRAWINGS

FIG. 1 is a partial enlarged perspective view of a conventional battery module.

FIG. 2 is a perspective view showing a battery module having a guide frame according to a first preferred embodiment of the present invention.

FIG. 3 is an exploded perspective view of the battery module having the guide frame according to the first preferred embodiment of the present invention.

FIG. 4 is an exploded perspective view of a frame assembly according to a first preferred embodiment of the present invention.

FIG. 5 is an exploded perspective view of a battery module having a guide frame according to a second preferred embodiment of the present invention.

FIG. 6 shows an example of a mold unit configured to manufacture a battery module according to the present invention.

FIG. 7 is a schematic view illustrating a method of manufacturing a battery module using the mold unit.

BEST MODE

Now, preferred embodiments of the present invention will be described in detail with reference to the accompanying drawings such that the preferred embodiments of the present invention can be easily implemented by a person having ordinary skill in the art to which the present invention pertains. In describing the principle of operation of the preferred embodiments of the present invention in detail, however, a detailed description of known functions and configurations incorporated herein will be omitted when the same may obscure the subject matter of the present invention.

In addition, the same reference numbers will be used throughout the drawings to refer to parts that perform similar functions or operations. In the case in which one part is said to be connected to another part in the entire specification, not only may the one part be directly connected to the other part, but also, the one part may be indirectly connected to the other part via a further part. In addition, that a certain element is included does not mean that other elements are excluded, but means that such elements may be further included unless mentioned otherwise.

Hereinafter, a battery module having a guide frame according to the present invention and a method of manufacturing the same will be described with reference to the accompanying drawings.

FIG. 2 is a perspective view showing a battery module having a guide frame according to a first preferred embodiment of the present invention, FIG. 3 is an exploded perspective view of the battery module having the guide frame according to the first preferred embodiment of the present invention, and FIG. 4 is an exploded perspective view of a frame assembly according to a first preferred embodiment of the present invention.

Referring to FIGS. 2 to 4, the battery module according to the first preferred embodiment of the present invention includes a cylindrical battery cell 100, a frame assembly 200, and a module case 300.

First, the cylindrical battery cell 100 may be manufactured by receiving a wound type electrode assembly in a metal can, injecting an electrolytic solution into the metal can, and coupling a cap assembly having an electrode terminal formed thereon to an open upper end of the metal can.

Here, the electrode assembly is manufactured by sequentially stacking a positive electrode, a negative electrode, and a separator and winding the same in a round shape.

A cylindrical center pin is inserted into a hollow core portion formed in a central region of the electrode assembly. The center pin is generally made of a metal material so as to have predetermined strength. The center pin functions to fix and support the electrode assembly, and also functions as a path configured to discharge gas generated as the result of internal reaction during charging and discharging of the cylindrical battery cell and during operation of the cylindrical battery cell.

Meanwhile, a positive electrode terminal is formed at a central region of the upper end of the cap assembly in a protruding shape, and the remaining region of the metal can form a negative electrode terminal.

Of course, the battery cell according to the present invention is not limited to the cylindrical battery cell 100 as long as the battery cell can be used as a secondary battery.

The frame assembly 200 includes a frame body 210 and a guide portion 220.

The frame body 210 is provided with a plurality of first receiving holes 211 spaced apart from each other by a predetermined distance, and the guide portion 220 is mounted in each of the first receiving holes 211.

A second receiving hole 221 configured to receive and support the cylindrical battery cell 100 is formed in the guide portion 220.

As a result, the guide portion 220 is received in the first receiving hole 211 of the frame body 210 in the state of wrapping the outer surface of the cylindrical battery cell 100.

Here, the frame body 210 may be made of a foam material having flame retardancy or low thermal conductivity, such as silicone, epoxy, polyurethane, or fiber, like whipped cotton. It is possible to achieve insulation between the cylindrical battery cells 100 received in the guide portions 220 and/or to minimize heat transfer between the cylindrical battery cells by the provision of the frame body.

Meanwhile, although the guide portion 220 is not particularly restricted as long as it is possible to receive and support the cylindrical battery cell 100, it is preferable for the guide portion to be made of a hard heat resistant plastic material in consideration of shape maintenance of the guide portion during molding of the frame body 210 and lightweight of the battery module. For example, mica or polycarbonate may be used.

The module case 300, which functions to protect the cylindrical battery cell 100 from external impact, may include an upper cover 310 configured to cover upper surfaces of the cylindrical battery cell 100 and the frame assembly 200 and a lower cover 320 located at lower surfaces of the cylindrical battery cell 100 and the frame assembly 200.

Here, in the battery module according to the first embodiment, the frame body 210 may serve as a side surface of the case, whereby it is possible to reduce battery module manufacturing cost.

FIG. 5 is an exploded perspective view of a battery module having a guide frame according to a second preferred embodiment of the present invention. Referring to FIG. 5, the battery module according to the second preferred embodiment of the present invention is identical to the battery module according to the first preferred embodiment described with reference to FIGS. 2 to 4 except that a module case 300 includes an upper cover 310 configured to cover upper surfaces of a cylindrical battery cell 100 and a frame assembly 200, a lower cover 320 configured to cover lower surfaces of the cylindrical battery cell 100 and the frame assembly 200, and a side cover 330 configured to wrap a side surface of the frame assembly 200, and therefore a description of the same construction will be omitted.

That is, in the battery module according to the second preferred embodiment of the present invention, the module case 300 further includes a side cover 330 configured to wrap a side surface of the frame assembly 200, whereby the module case has higher resistance to external impact.

FIG. 6 shows an example of a mold unit configured to manufacture a battery module according to the present invention, and FIG. 7 is a schematic view illustrating a method of manufacturing a battery module using the mold unit.

The battery module manufacturing method will be described with reference to FIGS. 6 and 7.

First, a mold unit 400 used to manufacture a battery module includes a mold body 410 and a support rod 420.

The mold body 410 is provided therein with a space, in which a frame body 210 is formed, and is provided in a side wall thereof with at least one injection hole 411, through which a foam material used to form the frame body 210 is injected.

In addition, a plurality of cylindrical support rods 420 formed at the bottom surface of the mold body 410 so as to extend in a vertical direction in order to fix guide portions 220 is provided inside the mold body 410.

Although two injection holes 411 are shown as being formed in the side surface of the mold body 410 in FIG. 6, one injection hole or three or more injection holes may be formed. In addition, the injection holes 411 may be omitted when a foam material is injected from above; however, it is preferable to provide the injection holes 411 for uniform filling.

Meanwhile, rod 420 has an outer diameter sufficient to be received in a second receiving hole 221 of the guide portion 220. Although the height of the support rod is not particularly restricted as long as the support rod can be upright in the state in which the guide portion 220 is mounted, it is preferable for the support rod not to protrude out of the guide portion 220 in consideration of manufacturing cost of the mold unit 400.

A method of manufacturing a battery module using the mold unit 400 having the above construction includes a step of locating guide portions 220 in the mold unit 400 having the plurality of support rods 420 spaced apart from each other by a predetermined distance, a step of injecting a foam material into an empty space between the mold unit 400 and the guide portions 220, a step of hardening the injected foam material to form a frame body 210, a step of separating the frame body 210 integrated with the guide portions 220 from the mold unit 400, and a step of receiving cylindrical battery cells 100 in the guide portions 220.

First, in the step of locating the guide portions 220 in the mold unit 400 having the plurality of support rods 420 spaced apart from each other by a predetermined distance, the guide portions 220 are fitted onto the support rods 420 formed at the bottom of the mold body 410 so as to wrap the support rods.

In the step of injecting the foam material into the empty space between the mold unit 400 and the guide portions 220, the foam material is injected into the mold body 410 through the injection hole 411 formed in the side surface of the mold body 410 and/or from above.

In the step of hardening the injected foam material to form the frame body 210, the foam material is hardened such that the shape of the frame body 210 formed from the foam material injected into the mold body 410 can be maintained even though the frame body 210 is separated from the mold body 410.

In the step of separating the frame body 210 integrated with the guide portions 220 from the mold unit 400, a frame assembly 200 integrated with the guide portions 220 as the result of the frame body 210 being formed from the injected foam material is separated from the mold unit 400.

In general, when the frame body 210 is separated from the mold unit 400, the frame body 210 may be damaged, for example torn, since the distance between first receiving holes 211 of the frame body is small.

In the frame body 210 according to the present invention, however, the guide portions 220 are fixed to the first receiving holes 211, whereby damage to the frame body 210 is minimized while separation is easily performed, and therefore it is possible to reduce a defect rate.

In the step of receiving the cylindrical battery cells 100 in the guide portions 220, the cylindrical battery cells 100 are received in second receiving holes 221 of the separated frame assembly 200, and the frame assembly 200 is wrapped by a module case 300 to form a battery module.

Those skilled in the art to which the present invention pertains will appreciate that various applications and modifications are possible within the category of the present invention based on the above description.

DESCRIPTION OF REFERENCE NUMERALS

100: Cylindrical battery cell
200: Frame assembly
210: Frame body
211: First receiving hole
220: Guide portion
221: Second receiving hole
300: Module case
310: Upper cover
320: Lower cover
330: Side cover
400: Mold unit
410: Mold body
411: Injection hole
420: Support rod

The invention claimed is:

1. A battery module comprising:

a plurality of cylindrical battery cells;

a frame assembly configured to receive the cylindrical battery cells; and a module case configured to wrap the cylindrical battery cells and the frame assembly, wherein the frame assembly comprises:

a frame body of a foam material, the frame body having first receiving holes therein; and guide portions of a plastic material fixed to the first receiving holes of the frame body with the guide portions integrated with the frame body, each of the guide portions defining a second receiving hole in which a respective one of the battery cells is received such that the guide portions respectively wrap outer surfaces of the cylindrical battery cells.

2. The battery module according to claim 1, wherein the foam material of the frame body has flame retardancy or low thermal conductivity.

3. The battery module according to claim 1, wherein the module case comprises:

an upper cover covering upper surfaces of the cylindrical battery cells and the frame assembly; and a lower cover at a lower surface of the frame assembly.

4. The battery module according to claim 3, wherein the module case further comprises a side cover configured to wrap a side surface of the frame assembly.

5. A battery pack comprising the battery module according claim 1.

6. A method of manufacturing the battery module comprising a plurality of cylindrical battery cells, a frame assembly configured to receive the cylindrical battery cells, and a module case configured to wrap the cylindrical battery cells and the frame assembly, wherein the frame assembly comprises a frame body having first receiving holes therein; and guide portions in the first receiving holes, the method comprising:

locating guide portions in a mold unit having a plurality of support rods spaced apart from each other by a predetermined distance;

injecting a foam material into an empty space between the mold unit and the guide portions;

hardening the injected foam material to form a frame body:

separating the frame body integrated with the guide portions from the mold unit; and receiving cylindrical battery cells in the guide portions.

7. The method according to claim 6, wherein the guide portions wrap the support rods.

8. The battery module according to claim 1, wherein the plastic of the guide portions includes a hard heat resistant plastic material.

9. A method of manufacturing the battery module according to claim 1, the method comprising:

locating guide portions in a mold unit having a plurality of support rods spaced apart from each other by a predetermined distance;

injecting a foam material into an empty space between the mold unit and the guide portions;

hardening the injected foam material to form a frame body;

separating the frame body integrated with the guide portions from the mold unit; and receiving cylindrical battery cells in the guide portions.

10. The method according to claim 9, wherein the guide portions wrap the support rods.

* * * * *